US 12,522,018 B2

(12) United States Patent
Seo et al.

(10) Patent No.: US 12,522,018 B2
(45) Date of Patent: Jan. 13, 2026

(54) TRANSFORMABLE WHEEL MODULE

(71) Applicants: IUCF-HYU (INDUSTRY-UNIVERSITY COOPERATION FOUNDATION HANYANG UNIVERSITY), Seoul (KR); KYONGGI UNIVERSITY INDUSTRY & ACADEMIA COOPERATION FOUNDATION, Suwon-si (KR)

(72) Inventors: Taewon Seo, Seoul (KR); Yun Hyuk Lee, Seoul (KR); Sijun Ryu, Seoul (KR); Hwa Soo Kim, Yongin-si (KR)

(73) Assignees: IUCF-HYU (INDUSTRY-UNIVERSITY COOPERATION FOUNDATION HANYANG UNIVERSITY), Seoul (KR); KYONGGI UNIVERSITY INDUSTRY & ACADEMIA COOPERATION FOUNDATION, Suwon-si (KR)

( * ) Notice: Subject to any disclaimer, the term of this patent is extended or adjusted under 35 U.S.C. 154(b) by 370 days.

(21) Appl. No.: 18/028,922

(22) PCT Filed: Aug. 23, 2021

(86) PCT No.: PCT/KR2021/011206
§ 371 (c)(1),
(2) Date: Mar. 28, 2023

(87) PCT Pub. No.: WO2022/071662
PCT Pub. Date: Apr. 7, 2022

(65) Prior Publication Data
US 2023/0331039 A1   Oct. 19, 2023

(30) Foreign Application Priority Data

Sep. 29, 2020 (KR) .................. 10-2020-0126828

(51) Int. Cl.
*B60B 19/04* (2006.01)
(52) U.S. Cl.
CPC ........ *B60B 19/04* (2013.01); *B60B 2900/551* (2013.01)
(58) Field of Classification Search
CPC ... B60B 19/04; B60B 2900/551; B60B 15/12; B60B 15/16; A61G 5/06; A61G 5/061; B62D 57/024; F16H 37/12
See application file for complete search history.

(56) References Cited

U.S. PATENT DOCUMENTS

| 2011/0233991 A1* | 9/2011 | Norman .................. B60B 11/02 |
| | | 301/36.2 |
| 2014/0158439 A1 | 6/2014 | Kim et al. |

(Continued)

FOREIGN PATENT DOCUMENTS

| CN | 102350917 A | | 2/2012 | |
| CN | 104443093 A * | | 3/2015 | ........... B62D 57/024 |

(Continued)

OTHER PUBLICATIONS

International Search Report for PCT/KR2021/011206 dated Jan. 3, 2022 (PCT/ISA/210).

*Primary Examiner* — Kip T Kotter
(74) *Attorney, Agent, or Firm* — Sughrue Mion, PLLC

(57) ABSTRACT

A transformable wheel module is disclosed. The transformable wheel module comprises: a plurality of lobes; and a mode switching unit for switching modes between a first traveling mode in which the lobes are coupled in a ring shape and a second traveling mode in which the lobes are separated from each other, wherein the mode switching unit can include: a first rotary link; a second rotary link positioned on the same rotational axis as the first rotary link; a plurality of first connecting links for individually connecting the first rotary link and the lobes; a plurality of second (Continued)

connecting links for individually connecting the second rotary link and the lobes; a first driving motor for rotating the first rotary link; and a second driving motor for rotating the second rotary link.

8 Claims, 8 Drawing Sheets

(56) References Cited

U.S. PATENT DOCUMENTS

2021/0214029 A1\* 7/2021 Mire .................... B62D 57/032
2021/0323346 A1\* 10/2021 Lee ......................... B60B 19/04

FOREIGN PATENT DOCUMENTS

| | | | | |
|---|---|---|---|---|
| CN | 108032678 A | \* | 5/2018 | |
| CN | 108790591 B | \* | 2/2020 | ............. B60B 19/02 |
| KR | 10-2012-0053236 A | | 5/2012 | |
| KR | 101350819 B1 | \* | 1/2014 | |
| KR | 101384826 B1 | \* | 4/2014 | |
| KR | 101512102 B1 | \* | 4/2015 | |
| KR | 10-2017-0083854 A | | 7/2017 | |
| KR | 10-2018-0089938 A | | 8/2018 | |
| KR | 10-2020-0071481 A | | 6/2020 | |
| KR | 10-2020-0083283 A | | 7/2020 | |

\* cited by examiner

[Fig. 2]

//TRANSFORMABLE WHEEL MODULE

CROSS REFERENCE TO RELATED APPLICATIONS

This application is a National Stage of International Application No. PCT/KR2021/011206 filed Aug. 23, 2021, claiming priority based on Korean Patent Application No. 10-2020-0126828 filed Sep. 29, 2020.

TECHNICAL FIELD

The present invention relates to a transformable wheel module, and more particularly, to a transformable wheel module capable of rolling along the ground, and moving through obstacle areas such as stairs and steps.

BACKGROUND ART

A robot is required to be able to overcome various obstacles existing in human living environments in order to smoothly perform various tasks in spaces where humans live. For example, a traveling robot capable of positional movements is necessary to overcome obstacles such as stairs as well as flat terrain. Researches on the traveling robot capable of overcoming the obstacles have been variously conducted.

A normal wheel is required to have a diameter more than twice the height of an obstacle to overcome the obstacle. Since it is inefficient to increase a diameter of the wheel, researches are being variously conducted in other ways. For example, attempts for developing a transformable wheel that can have a transformed shape are proceeding to overcome the obstacles by changing the shape of the wheel.

DISCLOSURE

Technical Problem

The present invention provides a transformable wheel module having a changed shape of a wheel so as to travel on the ground and move through obstacle areas such as stairs and steps.

In addition, the present invention provides a transformable wheel module capable of serving as an independent module to be combined with a moving member.

In addition, the present invention provides a transformable wheel module to adjust a transformable shape of a wheel.

Technical Solution

The transformable wheel module according to the present invention includes: a plurality of lobes; and a mode switching unit for switching modes between a first traveling mode in which the lobes are coupled in a ring shape and a second traveling mode in which the lobes are separated from each other, wherein includes the mode switching unit includes: a first rotary link; a second rotary link positioned on a same rotational axis as the first rotary link; a plurality of first connecting links for individually connecting the first rotary link and the lobes; a plurality of second connecting links for individually connecting the second rotary link and the lobes; a first driving motor for rotating the first rotary link; and a second driving motor for rotating the second rotary link.

In addition, the mode switching unit may further include: a first guide block coupled to a housing of the first driving motor and formed therein with a first guide groove; a second guide block coupled to a housing of the second driving motor and formed therein with a second guide groove; a first guide link having one end pin-coupled to the lobe and inserted into the first guide groove; and a second guide link having one end pin-coupled to the lobe and inserted into the second guide groove.

In addition, each of the first guide block, the second guide block, the first guide link, and the second guide link may be provided in the same number as the lobes, and each of the first guide link and the second guide link may be coupled one-to-one to the lobe.

In addition, the first guide links may be arranged at an angle of an identical size, and the second guide links may be arranged at an angle of an identical size.

In addition, the first rotary link may include: a disc-shaped first rotary plate; and a plurality of first link areas protruding in a radial direction of the first rotary plate and having an identical angle, in which each of the first connecting links may have one end pin-coupled to the first link area and an opposite end pin-connected to a first joint area formed inside the lobe.

In addition, the second rotary link may include: a disc-shaped second rotary plate; and a plurality of second link areas protruding in a radial direction of the second rotary plate and having an identical angle, in which each of the second connecting links may have one end pin-coupled to the second link area and an opposite end pin-connected to a second joint area formed inside the lobe, and the area in which the first guide link is pin-connected to the lobe may be positioned between the first joint area and the second joint area.

In addition, the opposite end of the first guide link may protrude to an outside of the first guide block, and the opposite end of the second guide link may protrude to an outside of the second guide block.

In addition, the first connecting link may be formed with a hole in a length direction thereof, and a protrusion inserted into the hole may be formed on one side of the second connecting link facing the first connecting link.

Advantageous Effects

According to the present invention, the transformable wheel module can roll along the ground in a first traveling mode, and can move through the obstacle area while the lobes sequentially come into contact with the ground in a second traveling mode.

In addition, according to the present invention, the lobes and the mode switching unit are integrally provided, so that the transformable wheel module can be coupled to various moving members.

In addition, according to the present invention, the transformable wheel module is configured to adjust rotation angles of the first rotary link and the second rotary link, so that the lobes can be arranged to have various shapes in the second traveling mode.

BEST MODE

Figure 1:
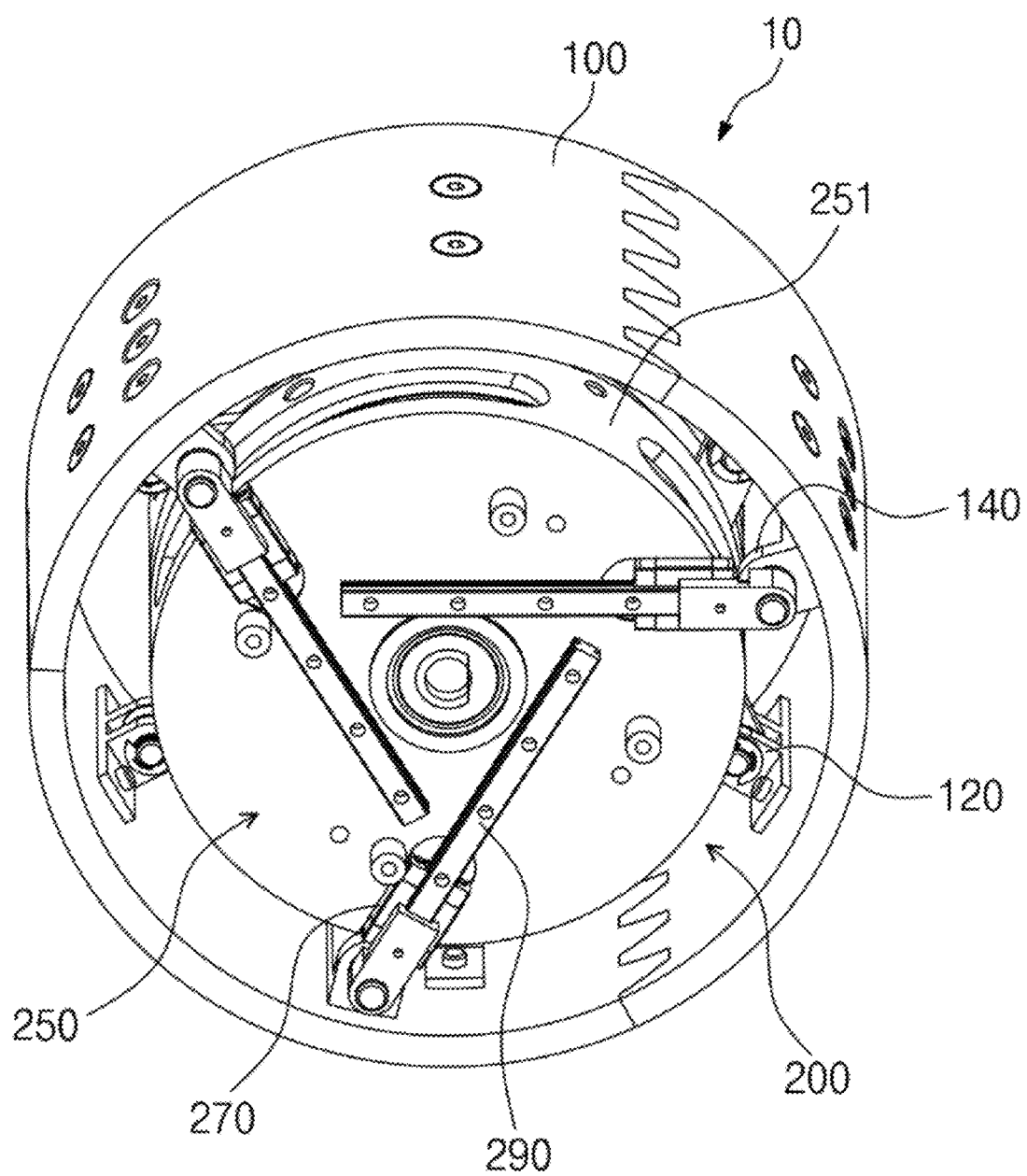
FIG. 1 is a perspective view showing a transformable wheel module according to the embodiment of the present invention.

A transformable wheel module according to the present invention includes: a plurality of lobes; and a mode switching unit for switching modes between a first traveling mode in which the lobes are coupled in a ring shape and a second traveling mode in which the lobes are separated from each other, wherein the mode switching unit may include: a first rotary link; a second rotary link positioned on a same rotational axis as the first rotary link; a plurality of first connecting links for individually connecting the first rotary link and the lobes; a plurality of second connecting links for individually connecting the second rotary link and the lobes; a first driving motor for rotating the first rotary link; and a second driving motor for rotating the second rotary link.

MODE FOR INVENTION

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification herein, when one component is mentioned as being on other component, it signifies that the one component may be placed directly on the other component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

Figure 2:
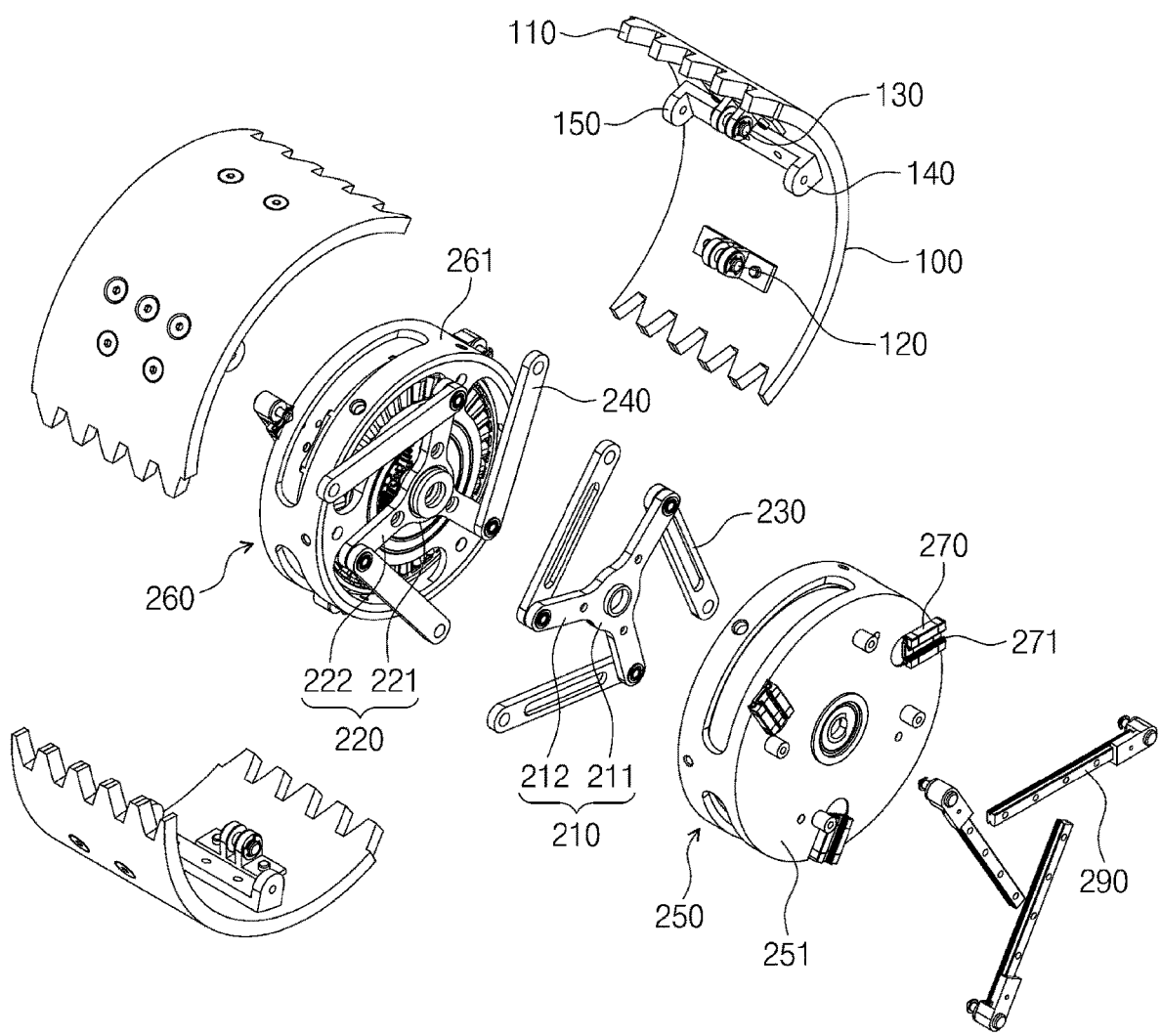
FIG. 2 is an exploded perspective view showing the transformable wheel module of FIG. 1.
Figure 3:
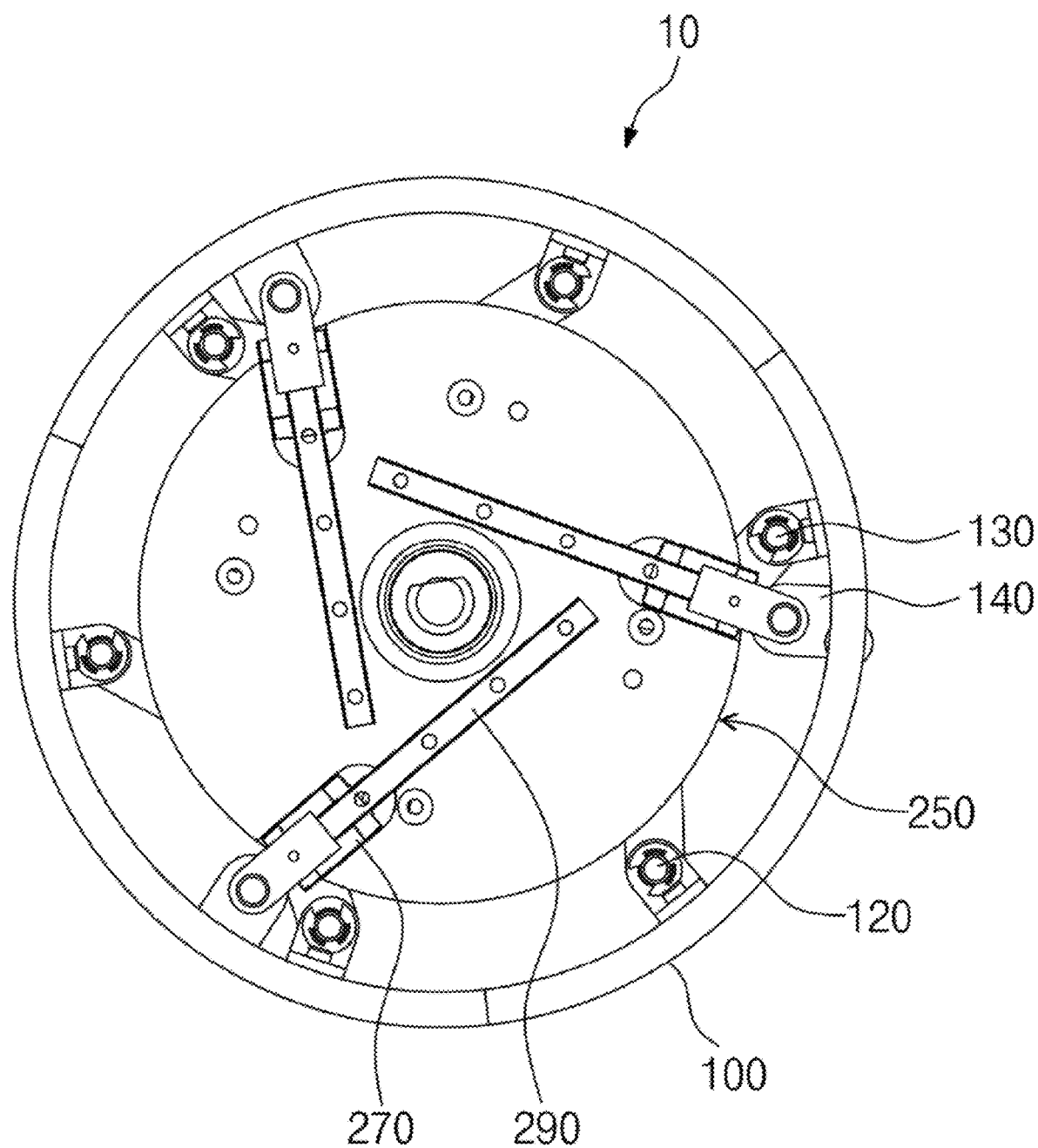
FIG. 3 is a front view showing the transformable wheel module of FIG. 1.
Figure 4:
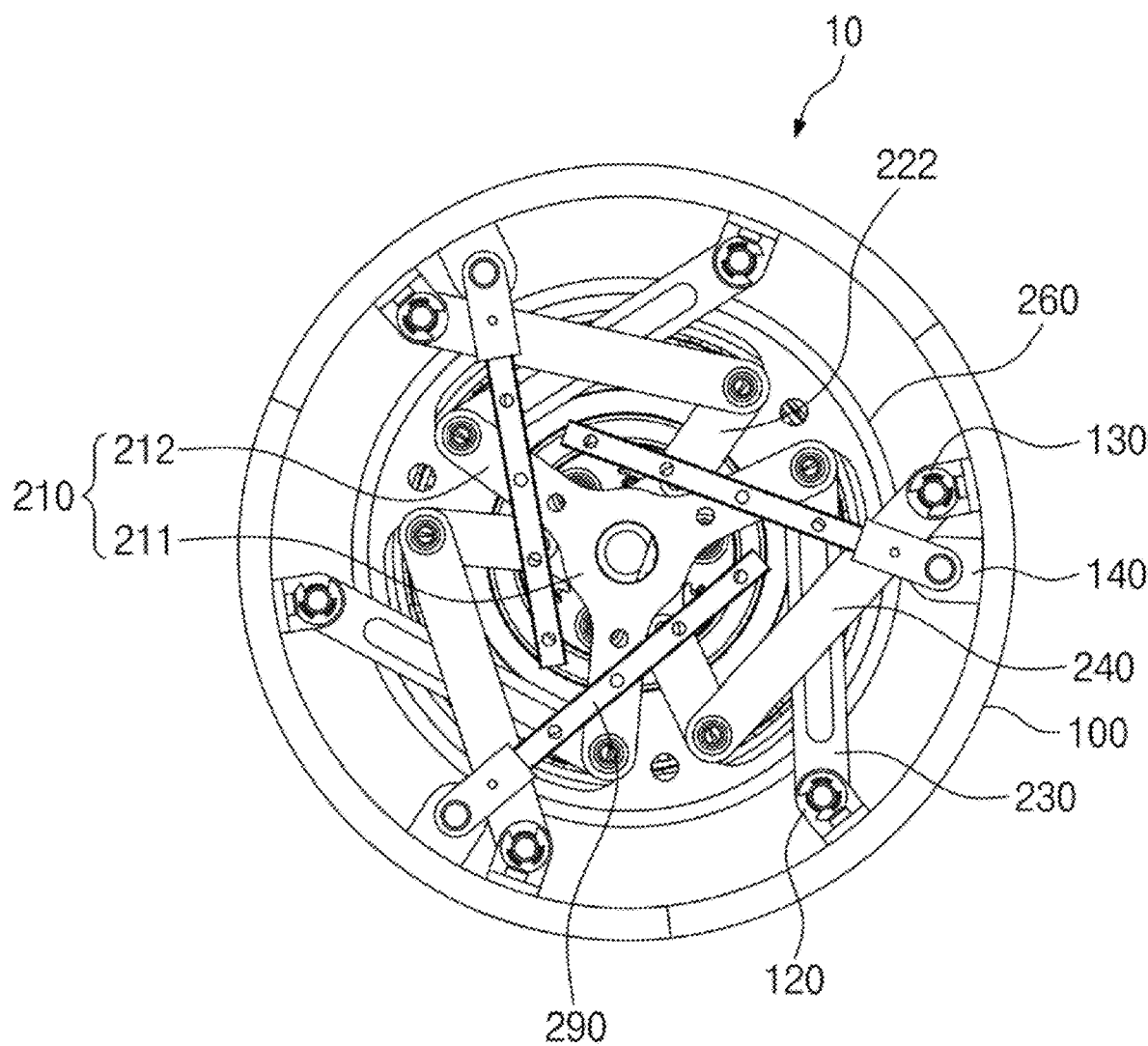
FIG. 4 is a view showing the transformable wheel module of FIG. 3 after a first driving motor and a first guide block are omitted.
Figure 5:
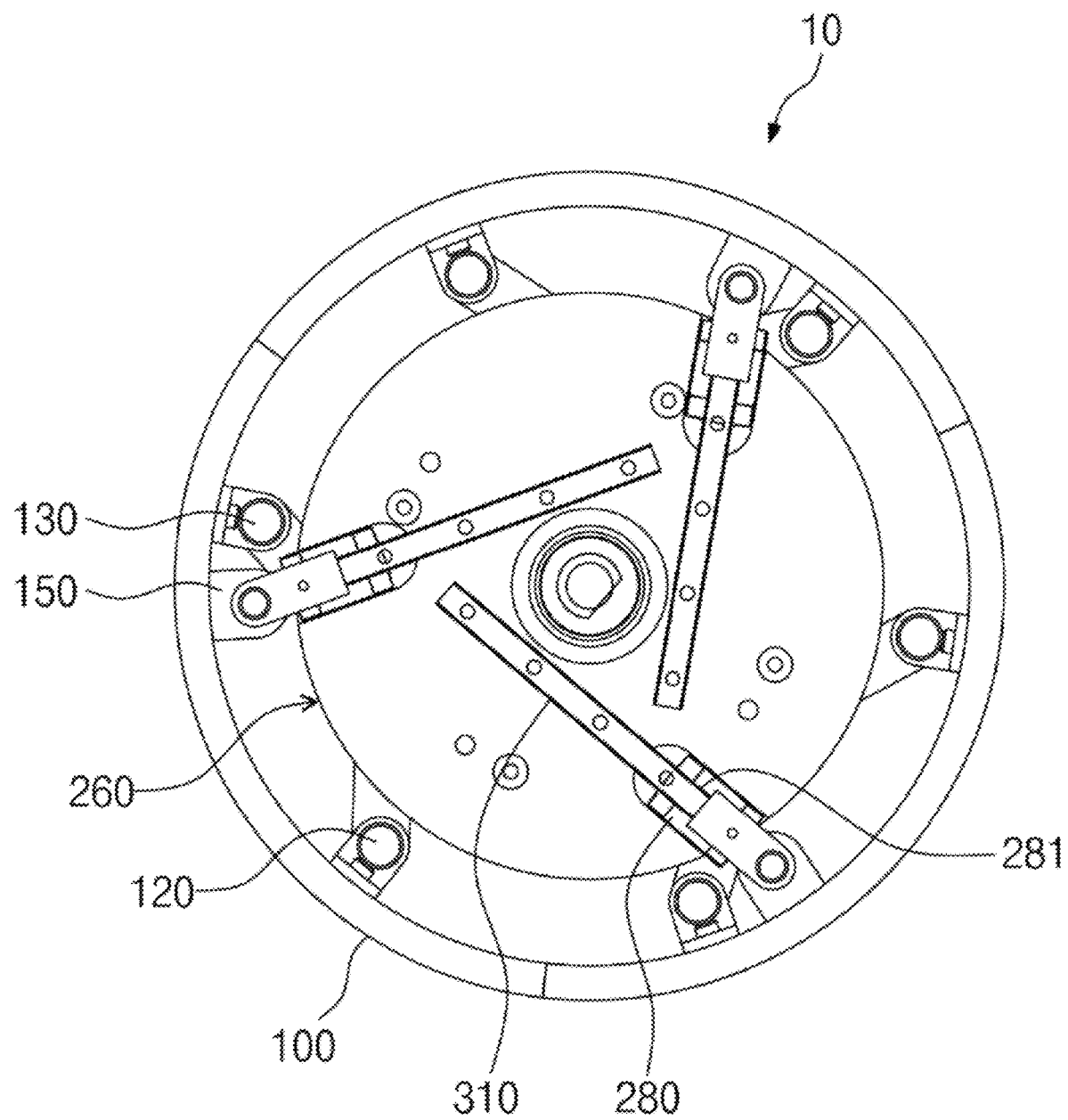
FIG. 5 is a rear view showing the transformable wheel module of FIG. 2.

FIG. 1 is a perspective view showing a transformable wheel module according to the embodiment of the present invention. FIG. 2 is an exploded perspective view showing the transformable wheel module of FIG. 1. FIG. 3 is a front view showing the transformable wheel module of FIG. 1. FIG. 4 is a view showing the transformable wheel module of FIG. 3 after a first driving motor and a first guide block are omitted. FIG. 5 is a rear view showing the transformable wheel module of FIG. 2.

Referring to FIGS. 1 to 5, a transformable wheel module 10 is mounted on a moving member (not shown) to assist movements of the moving member. The moving member refers to a device that travels in an environment with obstacles such as stairs or steps, and may include an indoor service robot, a delivery robot, an electric wheelchair and the like.

The transformable wheel module 10 according to the present invention includes a lobe 100 and a mode switching unit 200.

The lobe 100 refers to an arc-shaped plate having a predetermined radius, and is formed at both ends thereof with teeth 110. A plurality of lobes 100 are provided. The lobes 100 are provided in quantities and shapes that can be coupled to each other to form a circular ring shape. According to the embodiment, three lobes 100 are provided, and each of the lobes 100 is provided in an arc shape with an interior angle of 120°. A plurality of joint areas 120, 130, 140 and 150 are formed inside each of the lobes 100.

The mode switching unit 200 switches modes between a first traveling mode in which the lobes 100 are coupled to each other to form a circular ring shape and a second traveling mode in which the lobes 100 are separated from each other.

In the first traveling mode, the teeth 110 formed on adjacent lobes 100 are engaged with each other, and the lobes 100 form a circular ring shape. In the first traveling mode, the transformable wheel module 10 can roll along the ground.

In the second traveling mode, the transformable wheel module can move through obstacles while the lobes 100 are sequentially supported on the ground.

The mode switching unit 200 includes a first rotary link 210, a second rotary link 220, a first connecting link 230, a second connecting link 240, a first driving motor 250, a second driving motor 260, a first guide block 270, a second guide block 280, a first guide link 290, and a second guide link 310.

The first rotary link 210 are positioned inside the lobes 100, and provided to be rotatable about a rotational axis. The first rotary link 210 includes a first rotary plate 211 and first link areas 212. The first rotary plate 211 is provided in a disc shape, and the first link areas 212 protrude to a predetermined length in a radial direction of the first rotary plate 211. The first link areas 212 protrude in different directions about the rotational axis of the first rotary plate 211. According to the embodiment, three first link areas 212 may be provided, and arranged at an angle of 120° about the rotational axis of the first rotary plate 211.

The second rotary link 220 has a central axis positioned on the same line as the rotational axis of the first rotary link 210, and arranged to face the first rotary link 210. The second rotary link 220 has the same shape as the first rotary link 210. Specifically, the second rotary link 220 includes a second rotary plate 221 and second link areas 222. The second rotary plate 221 is provided in a disc shape, and the second link areas 222 protrude to a predetermined length in a radial direction of the second rotary plate 221. The second link areas 222 protrude in different directions about the rotational axis of the second rotary plate 221. According to the embodiment, three first link areas 222 may be provided, and arranged at an angle of 120° about the rotational axis of the second rotary plate 221.

The first connecting link 230 refers to a plate having a predetermined length, and connects the first rotary link 210 to the lobes 100. The first connecting link 230 is provided in the same number as the first link areas 212, and individually connects one first link area 212 to one lobe 100. The first connecting link 230 has one end pin-coupled to an end of the first link area 212, and an opposite end pin-coupled to a first joint area 120. For this reason, the first connecting link 230 is freely rotatable with respect to the first link area 212, and the lobe 100 is freely rotatable with respect to the first connecting link 230. According to the embodiment, a hole is formed in the first connecting link 230 in a longitudinal direction.

The second connecting link 240 refers to a plate having the same length as the first connecting link 230, and connects the second rotary link 220 to the lobe 100. The second connecting link 240 is provided in the same number as the second link areas 222, and individually connects one second link area 222 to one lobe 100. The second connecting link 240 has one end pin-coupled to an end of the second link area 222, and an opposite end pin-coupled to a second joint area 130. For this reason, the second connecting link 240 is freely rotatable with respect to the second link area 222, and the lobe 100 is freely rotatable with respect to the second connecting link 240. Although not shown in the drawing, a protrusion inserted into the hole formed in the first connecting link 230 is formed on one surface of the second connecting link 240 facing the first connecting link 230. When the first connecting link 230 and the second connecting link 240 are rotated, the protrusion moves within the hole in the longitudinal direction of the hole. Accordingly, the first connecting link 230 and the second connecting link 240 can move organically.

According to the above-described coupling relationship, the first connecting links 230 and the second connecting links 240 are coupled to the lobes 100, respectively, and the first connecting link 230 and the second connecting link 240 are provided to cross each other in a section between the first link area 212 and the first joint area 120.

The first driving motor 250 is positioned outside the first rotary link 210, and coupled to the first rotary plate 211. The first driving motor 250 rotates the first rotary link 210 about the rotational axis of the first rotary plate 211. The first driving motor 250 may rotate the first rotary link 210 clockwise and counterclockwise. According to the embodiment, a brushless DC motor (BLDC motor) may be used for the first driving motor 250.

The second driving motor 260 is positioned outside the second rotary link 220, and coupled to the second rotary plate 221. The second driving motor 260 rotates the second rotary link 220 about the rotational axis of the first second rotary plate 221. The second driving motor 260 may rotate the second rotary link 220 clockwise and counterclockwise. According to the embodiment, a BLDC motor may be used for the second driving motor 260.

The first guide block 270 is fixedly coupled to a housing 251 of the first driving motor 250. The first guide block 270 is provided in the same number as the lobes 100, so as to be spaced apart from each other along an edge area of the housing 251. First guide grooves 271 are formed in the first guide blocks 270, respectively. Longitudinal directions of the first guide grooves 271 are arranged in different directions about the rotational axis of the first rotary link 210.

The second guide block 280 is fixedly coupled to a housing 261 of the second driving motor 260. The second guide block 280 is provided in the same number as the lobes 100, so as to be spaced apart from each other along an edge area of the housing 261. Second guide grooves 281 are formed in the second guide blocks 280, respectively. Longitudinal directions of the second guide grooves 281 are arranged in different directions about the rotational axis of the second rotary link 220.

The first guide link 290 refers to a rod having a predetermined length, and has one end pin-coupled to a third joint area 140. The third joint area 140 is positioned between the first joint area 120 and the second joint area 130. According to the embodiment, the third joint area 140 may be positioned adjacent to the second joint area 130. The first guide link 290 is inserted into the first guide groove 271, and has an end protruding to the outside of the first guide groove 271. The first guide link 290 is provided in the same number as the first guide block 270, so as to be coupled one-to-one to the lobe 100 and the first guide block 270. The first guide links 290 may be arranged at an angle of the same size. According to the embodiment, three first guide links 290 may be provided, and have the longitudinal direction arranged at an angle of 60°.

The second guide link 310 refers to a rod having the same length as the first guide link 290, and has one end pin-coupled to a fourth joint area 150. The fourth joint area 150 may be positioned at the same point as the third joint area 140 between the first joint area 120 and the second joint area 130. The second guide link 310 is inserted into the second guide groove 281, and has an end protruding to the outside of the second guide groove 281. The second guide link 310 is provided in the same number as the second guide block 280, so as to be coupled one-to-one to the lobe 100 and the second guide block 280. The second guide links 310 may be arranged at an angle of the same size. According to the embodiment, three second guide links 310 may be provided, and have the longitudinal direction arranged at an angle of 60°.

Movement directions are limited by the guide blocks 270 and 280 when distances between the lobe 100 and the driving motors 250 and 260 are changed due to the switch of the traveling mode, so that the first guide links 290 and the second guide links 310 may move only in the longitudinal directions of the guide grooves 271 and 281.

Figure 6:
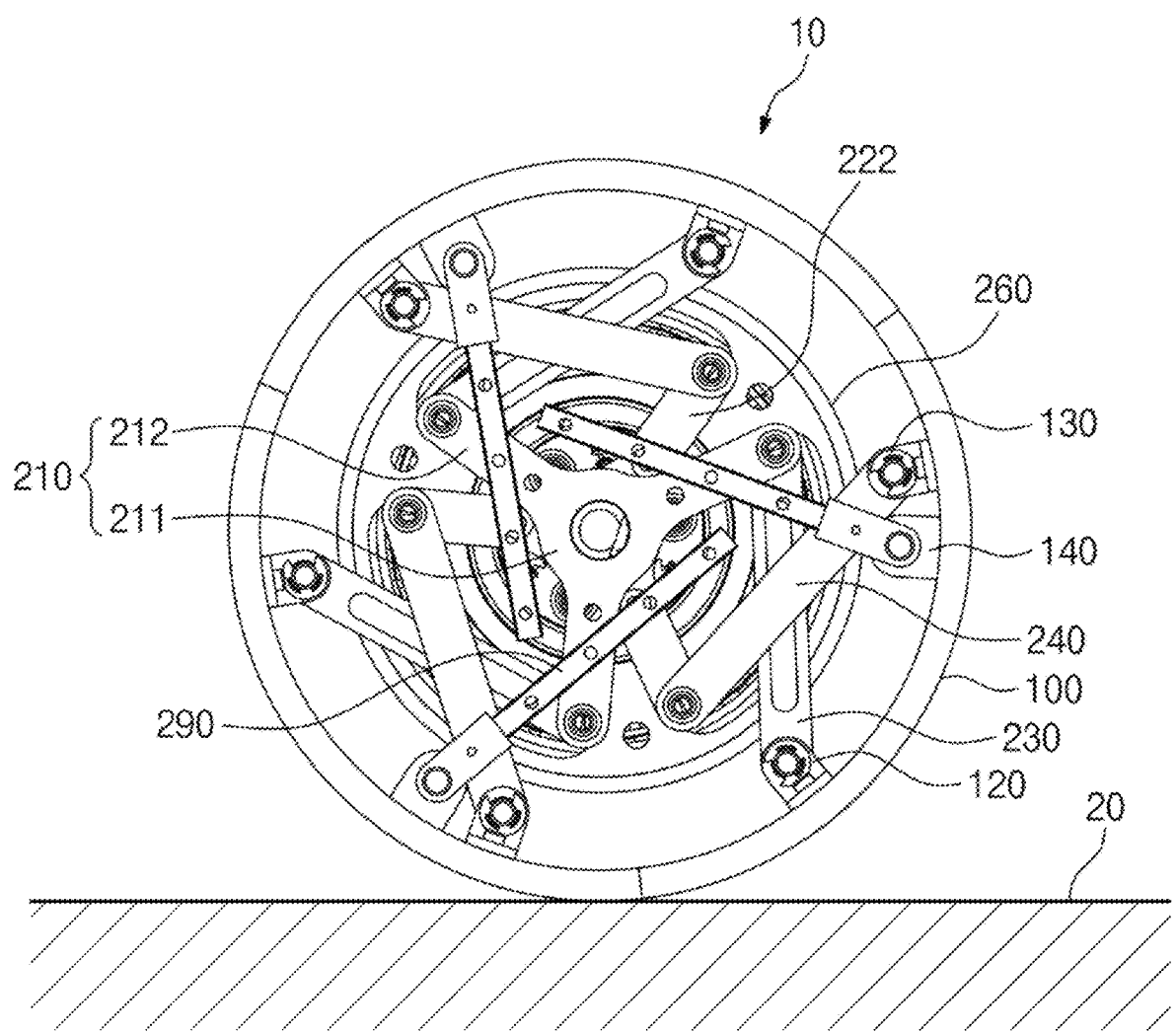
FIG. 6 is a view showing a first traveling mode according to one embodiment of the present invention.
Figure 7:
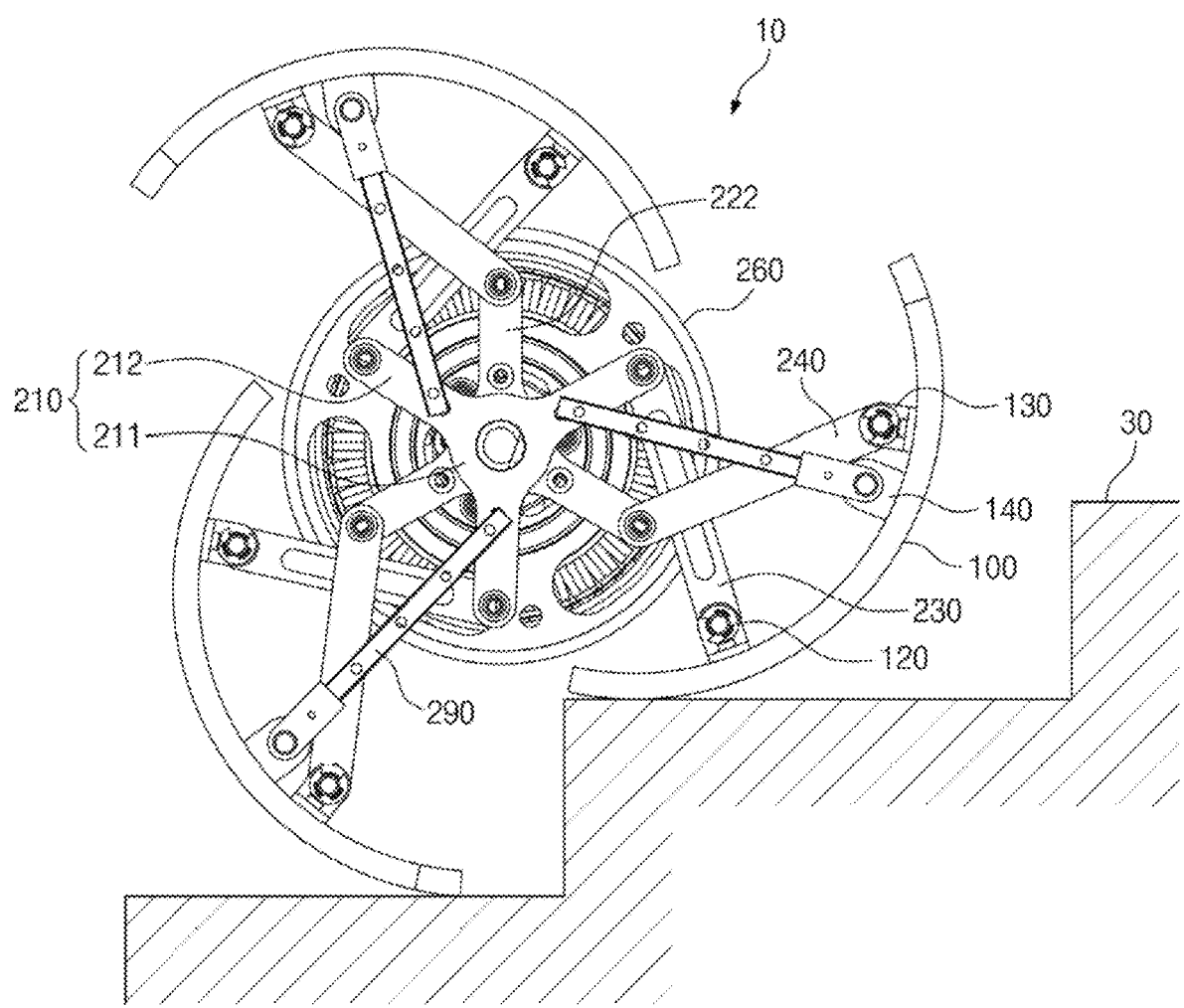
FIG. 7 is a view showing a second traveling mode according to one embodiment of the present invention.

FIG. 6 is a view showing the first traveling mode according to one embodiment of the present invention. FIG. 7 is a view showing the second traveling mode according to one embodiment of the present invention. For further understanding, the first driving motor and the first guide block are omitted in FIGS. 6 and 7.

Referring first to FIG. 6, the lobes 100 in the first traveling mode are coupled to each other to form a circular ring shape. The transformable wheel module 10 may move while the lobes 100 roll along the ground 20.

Referring to FIG. 7, the first driving motor 250 rotates the first rotary link 210 at a first angle, and the second driving motor 260 rotates the second rotary link 220 at a second angle greater than the first angle, so that a mode is switched to the second driving mode. When the first rotary link 210 is rotated, the first connecting link 230 is rotated relative to the first rotary link 210, and the lobe 100 is rotated relative to the first connecting link 230. In addition, when the second rotary link 220 is rotated, the second connecting link 240 is rotated relative to the second rotary link 220, and the lobe 100 is rotated relative to the second connecting link 240.

Since the first rotary link 210 and the second rotary link 220 have the different rotation angles, the angle between the first connecting link 230 and the first link area 212 is smaller than the angle between the second connecting link 240 and the second link area 222. For this reason, the lobe 100 is arranged to have one end adjacent to the first joint area 120 so as to be closer to the driving motors 250 and 260 than the opposite end adjacent to the second joint area 130.

When being rotated in the above state, the transformable wheel module 10 may climb stairs 30 while the lobes 100 are sequentially supported on the ground.

Figure 8:
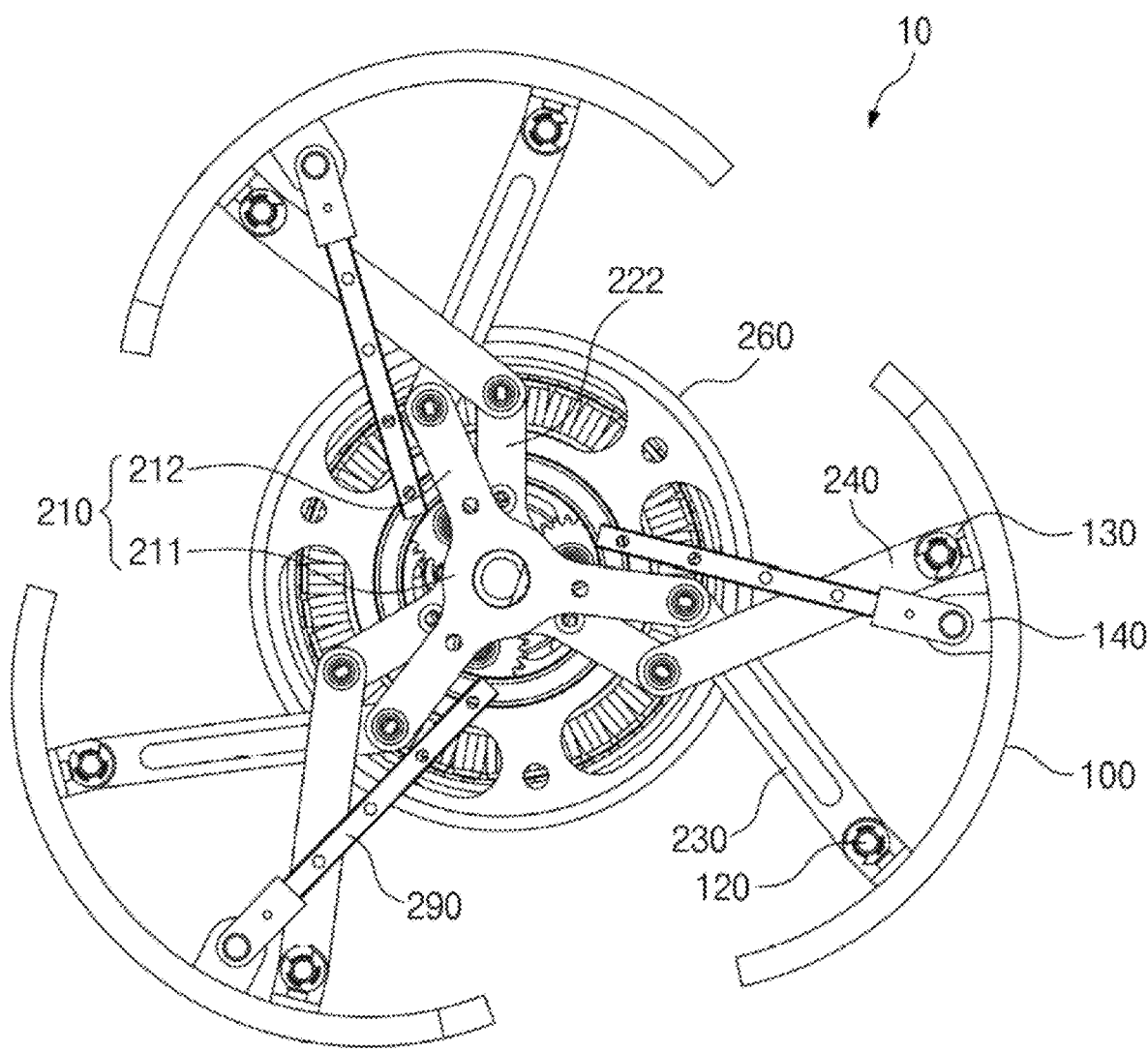
FIG. 8 is a view showing a second traveling mode according to another embodiment of the present invention.

FIG. 8 is a view showing the second traveling mode according to another embodiment of the present invention.

Referring to FIG. 8, the first and second driving motors 250 and 260 may rotate the first and second rotary links 210 and 220 at the same angle. In this case, in the second traveling mode, the angle between the first connecting link 230 and the first link area 212 is the same as the angle between the second connecting link 240 and the second link area 222, and the both ends of the lobe 100 are spaced apart from the housings 251 and 261 of the driving motors 250 and 260 by the same distance. In this case, the transformable wheel module 10 can move through an obstacle higher than the stairs 20 shown in FIG. 7.

Although the present invention has been described in detail using exemplary embodiments, the scope of the present invention is not limited to the specific embodiments, and will be interpreted by the appended claims. In addition, it will be apparent that a person having ordinary skill in the art may carry out various deformations and modifications for the embodiments described as above within the scope without departing from the present invention.

INDUSTRIAL APPLICABILITY

The transformable wheel module according to the present invention may be used to move through obstacle areas such as stairs and steps.

The invention claimed is:

1. A transformable wheel module comprising:
a plurality of lobes; and
a mode switching unit for switching modes between a first traveling mode in which the lobes are coupled in a ring shape and a second traveling mode in which the lobes are separated from each other, wherein
the mode switching unit includes:
a first rotary link;
a plurality of first connecting links for individually connecting the first rotary link and the lobes;
a first driving motor for rotating the first rotary link;
a first guide block coupled to a housing of the first driving motor and formed therein with a first guide groove; and
a first guide link having one end pin-coupled to the lobe and inserted into the first guide groove.

2. The transformable wheel module of claim 1, wherein the mode switching unit further includes:
a second rotary link positioned on a same rotational axis as the first rotary link;
a plurality of second connecting links for individually connecting the second rotary link and the lobes;
a second driving motor for rotating the second rotary link;
a second guide block coupled to a housing of the second driving motor and formed therein with a second guide groove; and
a second guide link having one end pin-coupled to the lobe and inserted into the second guide groove.

3. The transformable wheel module of claim 2, wherein each of the first guide block, the second guide block, the first guide link, and the second guide link is provided in a same number as the lobes, and each of the first guide link and the second guide link is coupled one-to-one to the lobe.

4. The transformable wheel module of claim 2, wherein the first guide links are arranged at an angle of an identical size, and the second guide links are arranged at an angle of an identical size.

5. The transformable wheel module of claim 2, wherein the first rotary link includes:
a disc-shaped first rotary plate; and
a plurality of first link areas protruding in a radial direction of the first rotary plate and having an identical angle, wherein
each of the first connecting links has one end pin-coupled to the first link area and an opposite end pin-connected to a first joint area formed inside the lobe.

6. The transformable wheel module of claim 5, wherein the second rotary link includes:
a disc-shaped second rotary plate; and
a plurality of second link areas protruding in a radial direction of the second rotary plate and having an identical angle, wherein
each of the second connecting links has one end pin-coupled to the second link area and an opposite end pin-connected to a second joint area formed inside the lobe, and
an area in which the first guide link is pin-connected to the lobe is positioned between the first joint area and the second joint area.

7. The transformable wheel module of claim 5, wherein the first connecting link is formed with a hole in a length direction thereof, and a protrusion inserted into the hole is formed on one side of the first link area facing the first connecting link.

8. The transformable wheel module of claim 2, wherein the opposite end of the first guide link protrudes to an outside of the first guide block, and the opposite end of the second guide link protrudes to an outside of the second guide block.

* * * * *